United States Patent [19]

Suzuki et al.

[11] Patent Number: 4,746,013
[45] Date of Patent: May 24, 1988

[54] DISC CARTRIDGE WITH RELEASABLE LOCKING MEANS

[75] Inventors: Akira Suzuki; Yoshikazu Ishimatsu, both of Kanagawa, Japan

[73] Assignee: Sony Corporation, Tokyo, Japan

[21] Appl. No.: 95,034

[22] Filed: Sep. 9, 1987

[30] Foreign Application Priority Data

Sep. 16, 1986 [JP] Japan ............... 61-14956[U]
Sep. 16, 1986 [JP] Japan ............... 61-141957[U]
Mar. 25, 1987 [JP] Japan ............... 62-43774[U]

[51] Int. Cl.$^4$ ............... B65D 85/57; G11B 23/04
[52] U.S. Cl. ............... 206/309; 206/1.5; 206/444; 220/326; 360/133; 369/291
[58] Field of Search ............... 206/1.5, 307, 309, 312, 206/313, 444; 220/326; 360/133; 369/77.2, 291

[56] References Cited

U.S. PATENT DOCUMENTS

| | | | |
|---|---|---|---|
| 4,344,646 | 8/1982 | Michel | 220/326 |
| 4,482,929 | 11/1984 | Beck et al. | 360/133 |
| 4,517,617 | 5/1985 | Tsuji et al. | 360/133 |
| 4,608,617 | 8/1986 | Oishi et al. | 360/133 |
| 4,669,078 | 5/1987 | Ogusu | 206/444 |
| 4,680,662 | 7/1987 | Fukushima et al. | 369/291 |
| 4,688,206 | 8/1987 | Nakagawa et al. | 369/291 |
| 4,702,369 | 10/1987 | Philosophe | 206/344 |

FOREIGN PATENT DOCUMENTS

| | | | |
|---|---|---|---|
| 2,486,497 | 1/1982 | France | 206/1.5 |
| 0016081 | 1/1986 | Japan | 369/291 |

*Primary Examiner*—Jimmy G. Foster
*Attorney, Agent, or Firm*—Philip M. Shaw, Jr.

[57] ABSTRACT

A disc cartridge including a housing main body having an opening portion for exposing a disc-shaped recording medium to the outside and for rotatably housing therein the disc-shaped recording medium, a shutter for opening and/or closing the opening portion of the housing main body and which is slidably attached to the housing main body so as to be movable in the direction perpendicular to the direction along which the disc cartridge is inserted into a recording and/or reproducing apparatus and in both the right and left directions with the opening portion of the housing main body as the center, a lid attached to the housing main body so as to be openable and closable for the opening portion, and a locking device which is formed on the housing main body and comprises an engaging portion to be engaged with the engaging portion formed on the lid, a single flexible arm member, an operation portion for breaking the engagement between the engaging portion and the engaging portion formed on the lid and a guide portion for guiding the operation portion rectilineally.

12 Claims, 13 Drawing Sheets

DISC CARTRIDGE WITH RELEASABLE LOCKING MEANS

BACKGROUND OF THE INVENTION

1. Field of the Invention

The present invention relates generally to disc cartridges and, more particularly, is directed to a disc cartridge for keeping therein a disc-shaped recording medium in such a fashion that the disc-shaped recording medium can be recorded and/or reproduced in that state.

2. Description of the Prior Art

A known disc cartridge is so arranged as to keep therein a disc-shaped recording medium such as a so-called compact disc or the like in such a fashion that the disc-shaped recording medium can be reproduced in that state. Conventionally, this type of a disc cartridge is provided with a lid hinged to a housing main body to be freely openable and closable to exchange a disc-shaped recording medium.

When the disc cartridge is arranged to be freely openable and closable as described above, the disc cartridge must be provided with a lock device to prevent the lid from being opened inadvertently under the condition that the disc-shaped recording medium is kept in the disc cartridge with its lid closed. In practice, it is desired that such lock device is easy to handle to release the lid from locking.

To this end, such a lock device is proposed and is disclosed in Japanese Utility Model Laid-Open Gazette No. 61-52377. An example of such a conventional lock device will be described hereinafter with reference to FIGS. 1 to 3.

Referring to FIG. 1, there is shown a disc cartridge 1 which generally comprises a housing main body 2 and a lid 3, which is made of a transparent synthetic resin material and is hinged to the housing main body 2 to be freely openable and closable. A cut-away concave portion 4 which takes the form of concavity is formed near each of both sides of the front end portion of a main wall portion 2a of the housing main body 2, and a lock release operation portion 5 is located within each of the cut-away concaved portions 4.

The lock release operation portion 5 will be described more fully. That is, as shown in FIG. 2, on the bottom surface of the cut-away concaved portion 4, there are formed two arm members 5a and 5b side-by-side with a predetermined spacing in the left and right directions. The two arm members 5a and 5b can respectively be extended forward and elastically deformed. As illustrated in FIG. 2, to the front end portions of the arm members 5a and 5b, there is fixed a release operation button 5c so as to extend across both the arm members 5a and 5b. On the upper portion of the front end of the arm member 5a, there is formed a lock nail member 5d which is protruded in the lateral direction. When the lid 3 is closed, as shown in FIG. 3A, this lock nail member 5d is engaged with a hook portion 6 formed on the lower surface of the front end portion of the lid 3, thus the lid 3 being locked.

In the thus constructed lock release operation portion 5, when the user touches the front surface of the lock release operation button 5c with his fingers and operates the same, both the arm members 5a and 5b are elastically deformed so that the release operation button 5c and the arm members 5a and 5b are displaced in the row direction in which the arm members 5a and 5b are provided side by side that is, in the direction shown by an arrow A in FIG. 3A. Accordingly, when the release operation button 5c is moved in the direction shown by an arrow A1 in FIG. 3B, as shown in this figure, the lock nail member 5d formed on the arm member 5a is disengaged from the hook portion 6 of the lid 3 to thereby break the locking of the lid 3, thus the lid 3 being opened to, for example, exchange a disc-shaped recording medium D (hereinafter simply referred to as a disc D).

As described above, according to the lock device used in the conventional disc cartridge, the lid 3 is locked to and released from the housing main body 2 by elastically deforming the two arm members 5a and 5b.

Referring back to FIG. 1, a concaved portion 2b is formed on the main wall portion 2a of the housing main body 2, and the shape of this concaved portion 2b is selected to be substantially the same as the outer peripheral shape of the disc D to keep the disc D in the concaved portion 2b. When kept in the disc cartridge 1, the disc D is restricted from moving within the housing main body 2 by the concaved portion 2b, and this concaved portion 2b can protect the outer peripheral edge of the disc D and also the recording portion of the disc D.

Further, through the concaved portion 2b of the housing main body 2, there are formed an insertion opening 2c into which a disc table of a recording and/or reproducing apparatus (not shown) is inserted when the disc cartridge 1 is loaded to the main body of the recording and/or reproducing apparatus and an opening 2d through which the disc D is exposed in part to the outside to enable a pickup device of the recording and/or reproducing apparatus to record on and/or reproduce from the disc D an information. The disc table (not shown) inserted through the insertion opening 2c holds the disc D with the aid of a support member 3a formed rotatably on the rear surface of the lid 3 and rotates the disc D in such a fashion that the disc D is floated above the bottom surface of the concaved portion 2b of the housing main body 2 by a predetermined amount.

In order to prevent dusts, smudges or the like from adhering through the opening portion 2d of the housing main body 2 to the disc D kept in the disc cartridge 1 upon non-use and also to protect the disc D from fingermarks when the disc cartridge 1 is loaded onto or ejected from the recording and/or reproducing apparatus, a shutter S is mounted on the housing main body 2 to become freely rotatable in the directions shown by arrows P1 and P2 in FIG. 1. The shutter S is provided with a slit S1 having a width equal to or wider than that of the opening portion 2d of the housing main body 2. When the shutter S is rotated in the direction shown by the arrow P2, the opening portion 2d is opened to enable the pickup device to read and/or record the information from and/or on the disc D. When the shutter S is rotated in the direction shown by the arrow P1, the opening portion 2d is closed to protect the disc D from the dusts, smudges, fingermarks, etc.

In this prior art example, the lock release operation portion 5 is formed as a quadrilateral by connecting the front ends of the two arm members 5a and 5b extended forward from the bottom surface of the cut-away concaved portion 4 with a predetermined spacing by the release operation button 5c so that when two arm members 5a and 5b are elastically deformed by operating the release operation button 5c, two arm members 5a and 5b interfere with each other to thereby reduce their freedom in being elastically deformed. As a result, the engaging amount of the lock nail member 5d formed on one arm member 5a with the hook portion 6 formed on the rear surface of the lid 3 must be reduced. Further, since the lock release operation button 5c is served as the free end portion, the lock release operation button 5c is twisted easily with the result that the engaging amount of the lock nail member 5d with the hook portion 6 becomes further smaller. This makes the locking imperfect, and there is a risk that the lock nail member 5d will be disengaged from the hook portion 6 inadvertently. In addition, since the two arm members 5a and 5b interfere with each other, they are made easy to break by the accumulated stress. Thus, the life span thereof will be shortened.

The pickup device to read and/or record a signal from and/or on the disc-shaped recording medium D is generally arranged such that its objective lens is placed at substantially the central position in the left to right direction of the opening portion 2d and then moved along the radius direction of the disc D. However, since the pickup device is so arranged as to incorporate in its housing an objective-lens-drive mechanism to adjust the objective lens in the focussing and tracking directions, the pickup device will be offset in either of right and left directions of the center line along the radius direction of the disc D through the opening portion 2d of the disc cartridge main body 2. Accordingly, if the opening portion 2d is formed through the disc cartridge main body 2 so as to correspond to the pickup device offset in either of the right and left directions, this disc cartridge can not be recorded and/or reproduced by a recording and/or reproducing apparatus having other type of a pickup device. That is, the disc cartridge disclosed in Japanese Utility Model Laid-Open Gazette No. 61-52377 can not be applied to various types of pickup devices. Therefore, it may be considered that only the objective lens of the pickup device be inserted into the opening portion 2d of the disc cartridge main body 2. In that case, since the distance between the disc surface of the disc D and the surface of the objective lens is so small that by the up and down movements of the disc D, the disc surface of the disc D and the surface of the objective lens contact with each other. There is then a possibility that the surface of the disc D and the surface of the objective lens will be scratched and then damaged.

OBJECTS AND SUMMARY OF THE INVENTION

Accordingly, it is a general object of this invention to provide an improved disc cartridge.

It is an object of this invention to provide a disc cartridge in which a lid can be locked positively to a housing main body.

It is another object of this invention to provide a disc cartridge in which a lid can be easily released from locking with a housing main body.

It is a further object of this invention to provide a disc cartridge which can be applied to pickup devices of any types including such a pickup device having an objective lens placed at the position offset in either of right and left directions due to an objective lens drive mechanism in the pickup device.

According to one aspect of the present invention, there is provided a disc cartridge comprising:

(a) a housing main body for rotatably housing therein a disc-shaped recording medium;

(b) a lid hinged to said housing main body to be freely rotatable; and (c) locking means provided on said housing main body, wherein said locking means is formed of a flexible signle arm member having an engagement portion engageable with an engaging member formed on said lid and having elasticity, an operation portion for elastically deforming said single arm member to thereby release the engagement of said engagement portion with said engaging member of said lid, and a guide member for guiding said operation portion rectilineally.

These and other objects, features and advantages of the present invention will become apparent from the following detailed description of the preferred embodiments that are to be read in conjunction with the accompanying drawings, throughout which like reference numerals identify like elements and parts.

BRIEF DESCRIPTION OF THE DRAWINGS

FIGS. 6A and 6B are respectively cross-sectional views of an engaging portion of a cartridge main body with the lid, wherein FIG. 6A illustrates that the housing main body and the lid are engaged with each other, whereas FIG. 6B illustrates that they are released from the engagement;

FIGS. 8A and 8B are respectively enlarged plan views of the main portion of the present invention used to explain its operation wherein FIG. 8A illustrates the engaged state whereas FIG. 8B illustrates the disengaged state;

DESCRIPTION OF THE PREFERRED EMBODIMENTS

The present invention will now be described in detail with reference to the attached drawings.

A first embodiment of the invention will be described with reference to FIGS. 4 to 10. In this embodiment, the present invention is applied to a disc cartridge which holds therein a disc-shaped recording medium (hereinafter simply referred to as a disc) D of shape and size the same as those of a so-called compact disc (CD) and so on. Of course, it is needless to say that the disc D held in the disc cartrige of the invention is not limited to the compact disc but may be applied to various kinds of disc-shaped recording mediums.

Figure 1:
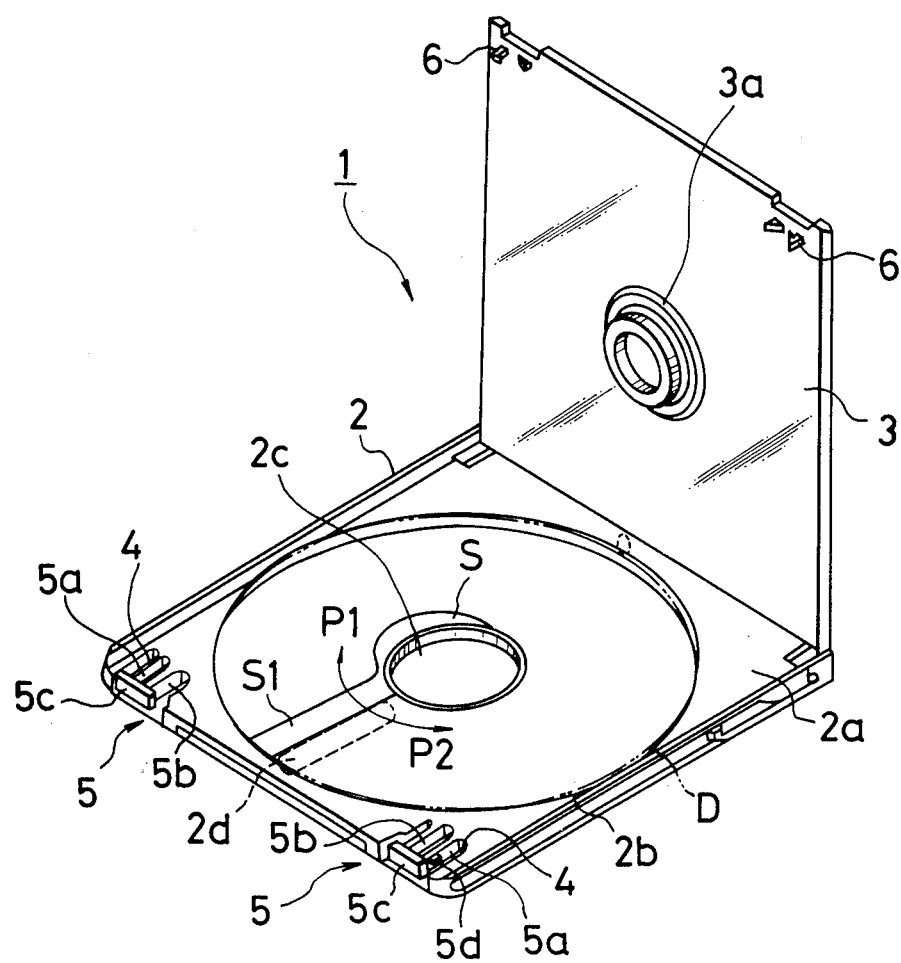
FIG. 1 is a perspective view illustrating an example of a conventional disc cartridge of which the lid is opened.
Figure 2:
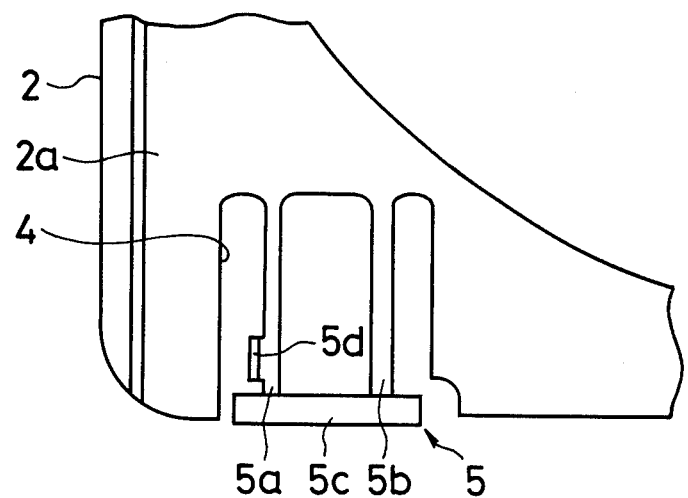
FIG. 2 is a plan view illustrating in an enlarged scale one portion of the disc cartridge shown in FIG. 1.
Figure 3A:
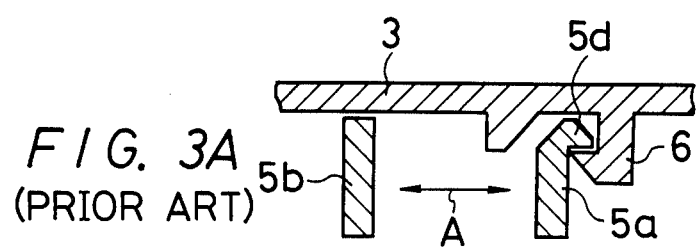
FIGS. 3A and 3B are respectively a cross-sectional views of a locking portion of the disc cartridge of FIG. 1 used to explain its operation.
Figure 3B:
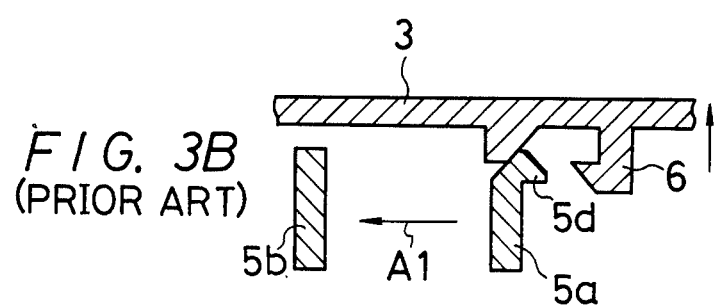
Figure 4:
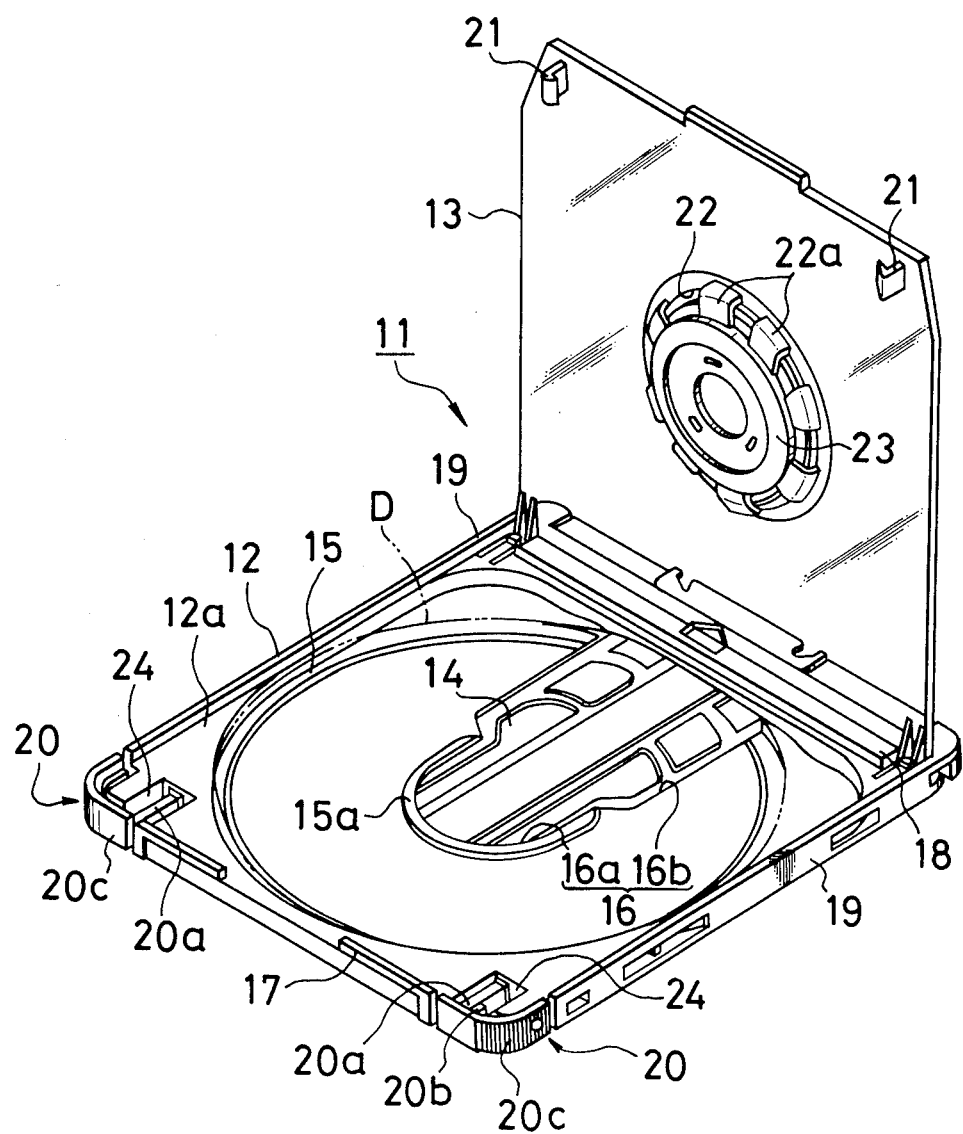
FIG. 4 is a perspective view showing an embodiment of a disc cartridge according to the present invention in which a lid thereof is opened.
Figure 5:
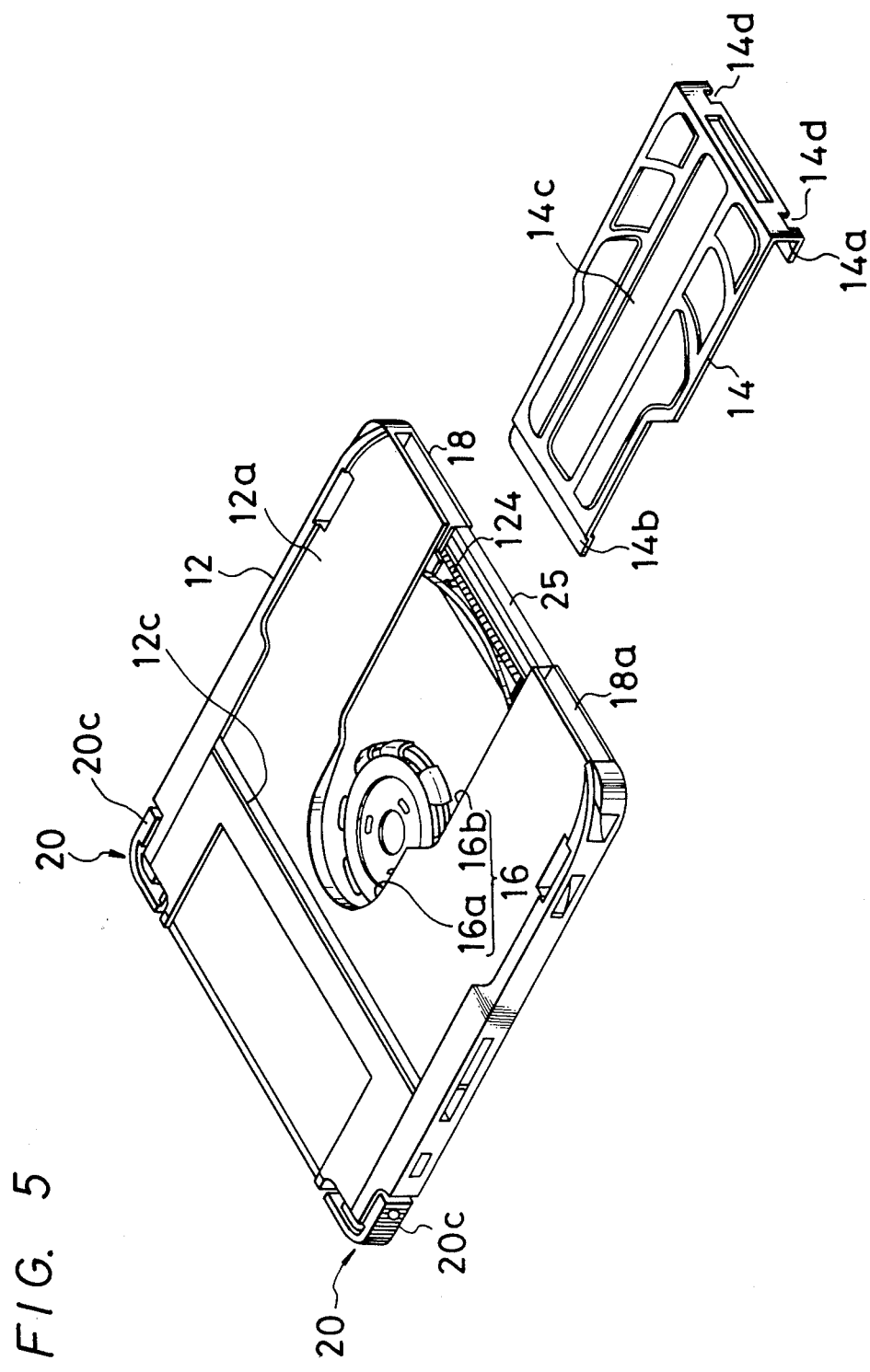
FIG. 5 is a partly exploded perspective view illustrating the back side of the disc cartridge of FIG. 4.

FIGS. 4 and 5 illustrate the first embodiment of a disc cartridge according to the present invention, respectively, in which FIG. 4 is a perspective view illustrating that the disc cartridge is opened and FIG. 5 is a partly exploded perspective view of its rear side.

Referring to FIGS. 4 and 5, a disc cartridge 11 mainly comprises a housing main body 12, a lid 13 and a shutter 14.

The housing main body 12 is a solid member of rectangular-shaped plate made of a molded synthetic resin material. On the housing main body 12, a circular concaved disc holder portion 15 for holding thereon the disc D is formed at the center portion of its major surface portion 12a. The disc holder portion 15 is provided with an opening 16 formed from the central portion of the disc holder portion 15 to the rear portion thereof. The opening 16 is formed of a circular opening portion 16a selected in shape so as to correspond to a disc table of a recording and/or reproducing pickup device (not shown) and a rectangular-shaped opening portion 16b continuous to the circular opening portion 16a and to the rear side so as to correspond to the movable portion of a recording and/or reproducing pickup device. Around the peripheral edge of the circular opening portion 16a, there is formed a holder edge surface 15a as a protruded portion. On the front end edge portion of the major surface portion 12a, there is formed a front wall portion 17, and a rear wall portion 18 is formed on the rear end edge portion of the major surface portion 12a. Side wall portions 19, 19 are respectively formed on right and left side end edge portions of the major surface portion 12a. Locking means 20, 20 for locking the lid 13 are respectively formed on both front corner portions of the major surface portion 12a. The locking means 20, 20 will be described later more fully.

To the rear wall portion 18, there is rotatably pivoted the rectangular-shaped lid 13 which corresponds to the major surface portion 12a. Similarly to the prior art, this lid 13 is formed of a molded transparent synthetic resin material and is selected in size to be engaged with the inner surface sides of the peripheral wall portions 17, 18, 19 and 19 of the major surface portion 12a of the housing main body 12. Engagement hook portions 21, 21 are projected from the inner surface of the front portion of the lid 13 at its nearby portions of both the corner portions thereof. On the central portion of the lid 13, there is formed a circular opening 22 corresponding to the circular opening portion 16a of the opening 16 in the housing main body 12. Then, a stabilizer 23 is inserted into this opening 22 with a clearance and is supported by a plurality of support nail members 22a formed around the peripheral edge of the circular opening 22 so as to be rotatable and swinging.

This stabilizer 23 is adapted to hold the central portion of the disc D which is inserted into and held on the disc holder portion 15 of the housing main body 12 of the disc cartridge 11. In this embodiment, the stabilizer 23 is made of a synthetic resin material and formed to be a disc-shaped one. This stabilizer 23 houses thereinto a magnetic metal plate (not shown) which enables the stabilizer 23 to hold the disc D magnetically, or in a so-called magnet-chucking fashion in cooperation with the disc table.

Since both locking means 20 and 20 formed on the housing main body 12 to lock the lid 13 are constructed the same, only the locking means 20 formed at the right-hand corner of the housing main body 12 will be described in detail with reference to FIGS. 6 to 10 as an example.

Figure 8A:
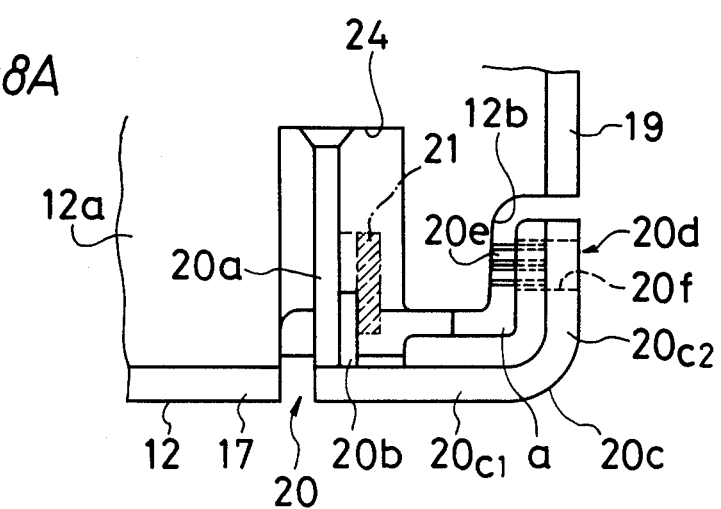
Figure 8B:
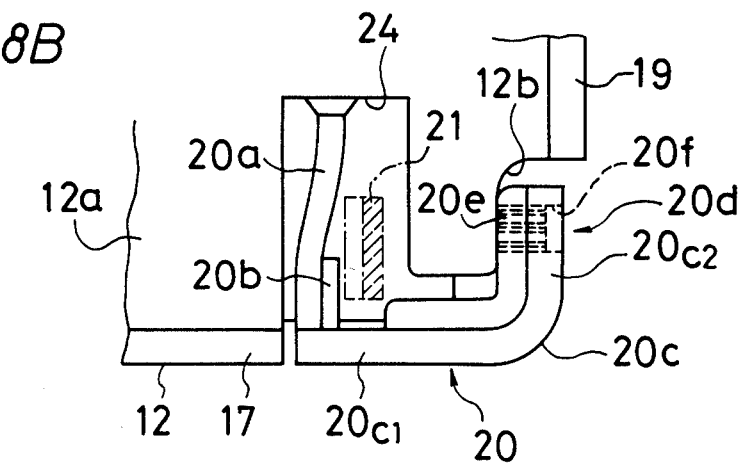
Figure 9:
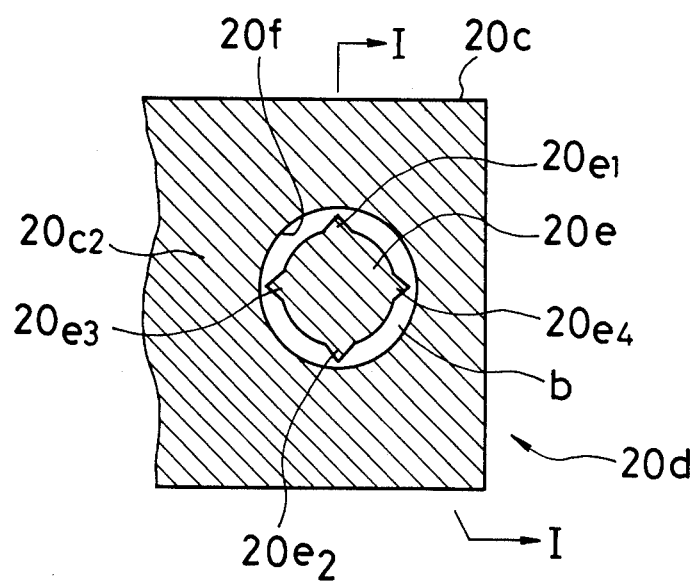
FIG. 9 is an enlarged cross-sectional view of a guide member of the present invention.
Figure 10:
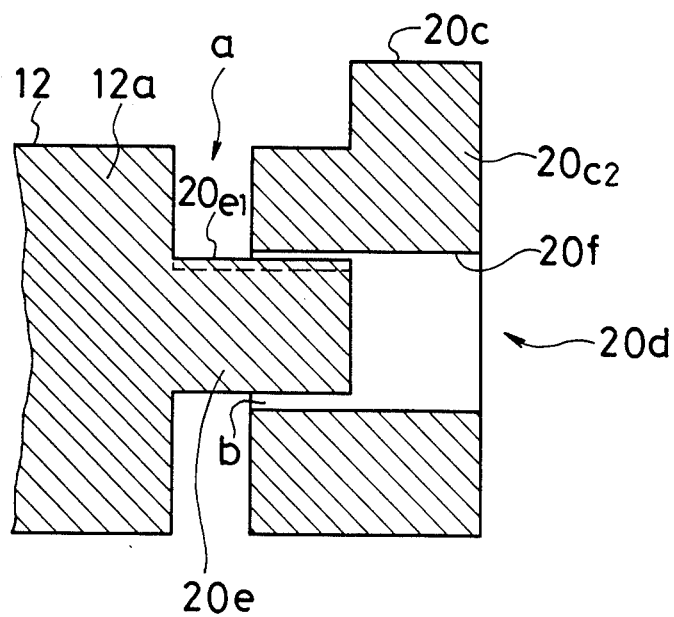
FIG. 10 is a cross-sectional view taken along a line I—I in FIG. 9.

As illustrated in FIGS. 8A and 8B, in the locking means 20 which is provided at the right-hand corner of the housing main body 12, a cut-away concaved portion 24 is formed near the right-hand corner portion of the front end portion of the major surface portion 12a so as to extend forwards. A single arm member 20a is formed to extend forward from the rear end or bottom surface of the cut-away concaved portion 24. This arm member 20a is so formed that it can be elastically deformed in the lateral direction. On one side surface portion of the front end of this arm member 20a, there is formed a lock nail member 20b which is to be engaged with the right hook portion 21 of the afore-mentioned lid 13. A lock release operation portion 20c is integrally formed with the arm member 20a as one unit at its front end portion. The lock release operation portion 20c is formed as a substantially L-shaped portion which is extended from the right side end portion of the front wall portion 17 to the front end portion of the right side wall portions 19 corresponding to a cut-away portion 12b formed near the right-hand corner portion of the major surface portion 12a. The lock release operation portion 20c is coupled at its front arm portion $20_{c1}$ corresponding to the front wall portion 17 to the arm member 20a in the direction perpendicular to each other, and a side arm portion $20_{c2}$ of the lock release operation portion 20c corresponding to the side wall portion 19 is opposed to the front end portion of the side surface of the major surface portion 12a with a predetermined spacing a. Within this spacing a, there is formed a guide portion 20d by which the lock release operation portion 20c is guided in the lateral direction, or in the direction substantially perpendicular to the arm member 20a. As illustrated in FIGS. 9 and 10, the guide portion 20d comprises a guide shaft portion 20e projected from the front end side surface of the major surface portion 12a to the lateral direction and a guide opening portion 20f which passes through the side arm portion $20_{c2}$ of the operation portion 20c in the lateral direction. A predetermined clearance b is formed between the guide shaft portion 20e and the guide opening portion 20f due to a metal mold upon molding. In this embodiment, in order to reduce the clearance b, protruded portions $20_{e1}$, $20_{e2}$, $20_{e3}$ and $20_{e4}$ are respectively formed on the outer peripheral surface of the guide shaft portion 20e along its axial direction and its upper and lower positions and also its back and forth positions. Instead of the protruded portions $20_{e1}$ to $20_{e4}$ formed on the outer peripheral surface of the guide shaft portion 20e, it is possible to form similar protruded portions on the inner peripheral surface of the guide opening portion 20f.

In order to form the protruded portions $20_{e1}$ to $20_{e4}$ on the outer peripheral surface of the guide shaft portion 20e or the inner peripheral surface of the guide opening portion 20f, a thin portion must be formed on the metal molds for the guide shaft portion 20e and the guide opening portion 20f, or the cylindrical slide metal mold so that the height of each of the protruded portions is determined on the basis of the strength of the metal mold.

Figure 11:
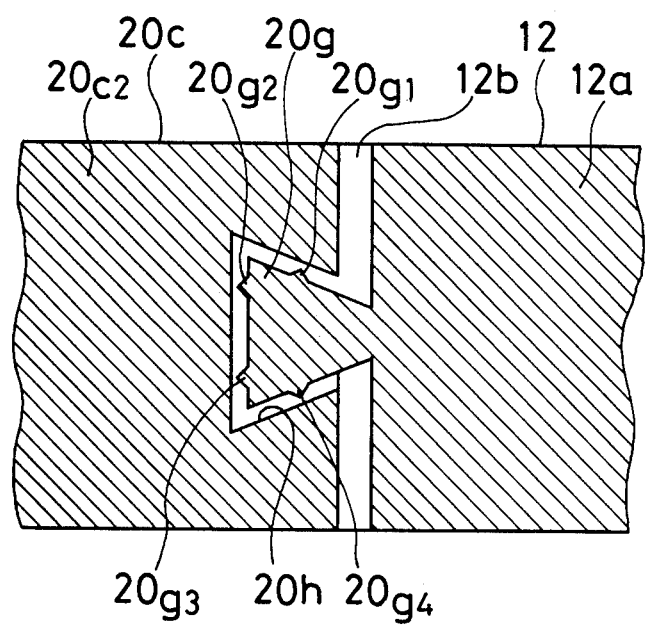
FIG. 11 is a cross-sectional view illustrating a main portion of another example of the guide portion according to the present invention.

The guide portion 20d is not limited to the engagement between the shaft portion and the opening portion but may be formed so as to have an engagement between a dovetail portion 20g and a dovetail groove portion 20h as, for example, shown in FIG. 11. Also, in this case, protruded portions $20_{g1}$, $20_{g2}$, $20_{g3}$ and $20_{g4}$ are respectively formed on the outer surface of the dovetail portion 20g. Alternatively, the above mentioned protruded portions may be formed on the inner surface of the dovetail groove portion 20h.

Figure 6A:
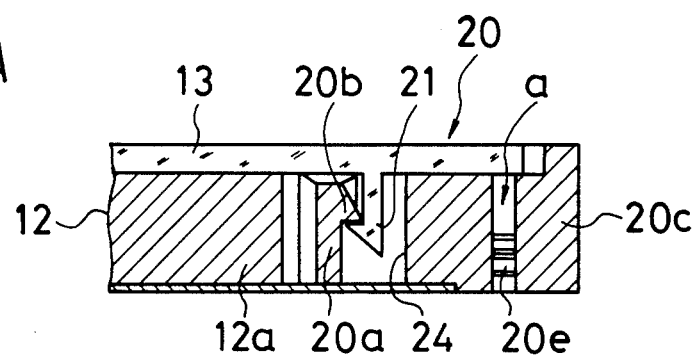
Figure 6B:
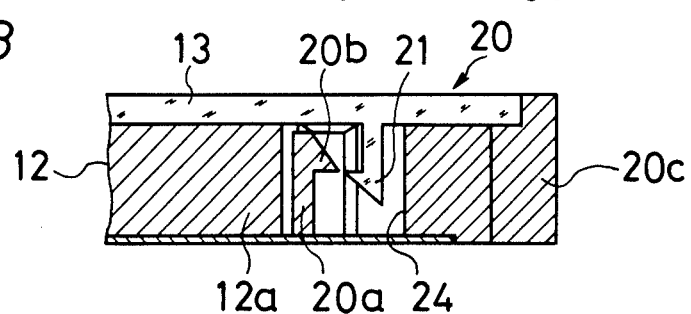
Figure 7:
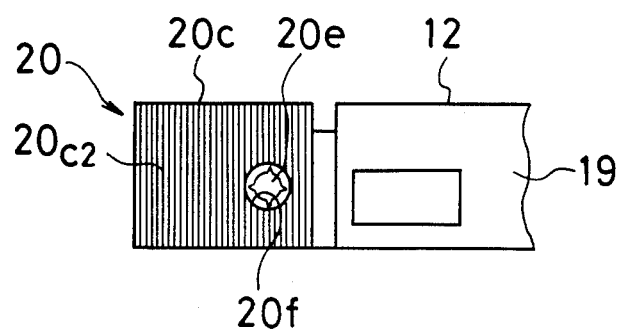
FIG. 7 is a side view illustrating a main portion of the housing main body of the disc cartridge of the present invention.

Under the state that the lid 13 is reclined forward relative to the housing main body 12 and closed, as shown in FIG. 6A, the thus constructed locking means 20 locks the lid 13 by engaging the lock nail member 20b of the arm member 20a with the hook portion 21 of the lid 13. Under this locking state, if the side arm portion $20_{c2}$ of the lock release operation portion 20c is pressed inwardly by the finger, the arm member 20a is deformed with flexibility and displaced together with the lock release operation portion 20c with the result that, as shown in FIG. 6B, the lock nail member 20b of the arm member 20a is disengaged from the hook portion 21 of the lid 13, thus the lid 13 being released from locking. During this operation, the lock release operation portion 20c is shifted or displaced rectilineally without being swung due to the slidable engagement of the guide shaft portion 20e, namely, its protruded portions $20_{e1}$ to $20_{e4}$ with the inner peripheral surface of the guide opening portion 20f in the guide portion 20d. Accordingly, the arm member 20a can be elastically deformed satisfactorily.

Turning back to FIG. 5, the shutter 14 is formed of a thin plate such as a metal plate or the like to close the opening 16 in the housing main body 12. The shutter 14 is made to contact with the rear surface side of the major surface portion 12a of the housing main body 12. A rear portion 14a of the shutter 14 is formed to have a U-shaped cross-section and is movably engaged with a sliding member or slider 25 which can be slid along a guide groove 18a formed at the rear surface side of the rear wall portion 18 in the lateral direction of the major surface portion 12a. A front portion 14b of the shutter 14 is inserted into a slit portion 12c formed through the front portion of the rear surface side of the major surface portion 12a in the lateral direction and is slidably moved in the lateral direction, thus opening and closing the opening 16. The slider 25 is biased by a spring 124 (see FIG. 12) so as to be always placed at the central position, whereby the shutter 14 always closes the opening 16. Further, on the rear surface side of the shutter 14, there is formed a guide concaved groove 14c which is extended in the longitudinal direction of the shutter 14 at its center and in the lateral direction thereof in a rib-like fashion.

Then, a mechanism by which the shutter 14 is returned to the central position where the shutter 14 closes the opening 16 will be described hereinafter.

Figure 12:
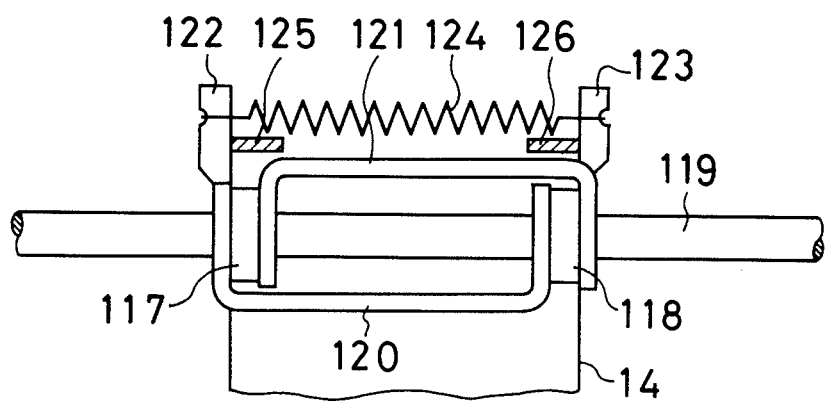
FIG. 12 is a plan view illustrating a main portion of a spring mechanism according to the present invention used to return a shutter to the original condition.

As illustrated in FIG. 12, guide members 117 and 118 are fixed to the left and right front ends of the shutter 14, respectively. The guide members 117 and 118 are guided by a guide rod 119, and slide members 120 and 121 are guided by this guide rod 119. The sliding members 120 and 121 are each formed to have a U-shape and are respectively provided with engaging piece members 122 and 123. The spring 124 is tensioned between two engaging members 122 and 123 and the engaging members 122 and 123 are made respectively to contact with stopper members 125 and 126.

Figure 15:
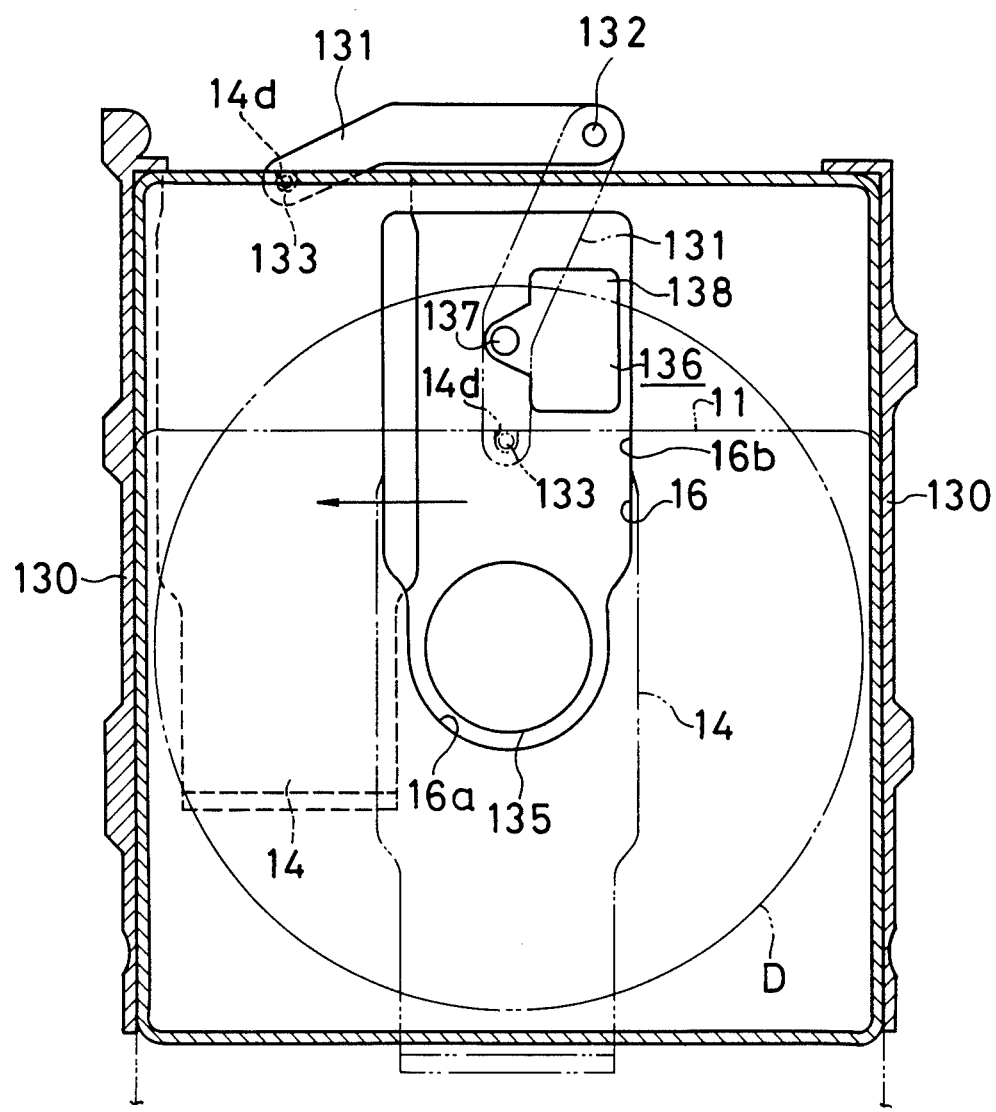
FIG. 15 is a plan view of a main portion of a mechanism provided in a recording and/or reproducing apparatus according to the present invention and illustrating the shutter moved in the left-hand direction.

The construction to open the shutter 14 will next be described. As shown in FIG. 15, the recording and/or reproducing apparatus (not shown) to which the disc cartridge 11 is loaded is provided with a pair of right and left insertion guide members 130 and 130. A lever 131 for opening the shutter 14 is provided to oppose the space between these guide members 130 and 130. The lever 131 is rotatably supported on the apparatus by a supporting pin 132 and is ordinarily placed at the position shown by a two-dot chain line in FIG. 15. The lever 131 is provided with a pin 133 at its free end, and this pin 133 is engaged with the notch 14d of the shutter 14 so as to open the shutter 14. In this case, two notches 14d and 14d (see FIG. 5) may be provided on the shutter 14 with a distance in the direction along which the shutter 14 is slidably moved.

With the construction made hereinabove, when such a pickup device 136 which is provided with an objective lens drive mechanism 138 placed at the right-hand side relative to its objective lens 137 is employed as shown in FIG. 15, the shutter 14 is moved leftwardly as shown in FIG. 15 by the broken line. In this case, the supporting pin 132 of the lever 131 is previously displaced rightwardly relative to the center.

If the disc cartridge 11 is inserted between the insertion guide members 130 and 130 of such apparatus, when the front end of the disc cartridge 11 is inserted into up to the position as shown by a two-dot chain line in FIG. 15, the notch 14d of the shutter 14 is engaged with the pin 133 implanted at the free end of the lever 131. Under this state, if the disc cartridge 11 is further guided upwards in the figure along the guide members 130 and 130, the lever 131 is rotated with the supporting pin 132 as the center in the clockwise direction. Accordingly, the shutter 14 is moved leftwardly by the pin 133 in association with the rotation of this lever 131, whereby the opening 16 of the disc cartridge 11 is opened as shown in FIG. 15. In other words, the shutter 14 completely opens the central circular opening portion 16a of the opening 16 of the disc cartridge 11. At a rsult, a disc table 135 is inserted into the disc cartridge 11 through this opening portion 16a of the opening 16. Further, the shutter 14 completely opens the right-hand portion of the reactangular opening portion 16b of the opening 16 while covering a part of the left-hand portion of the opening portion 16b. That is, this provides an opening portion large enough to enable the pickup device 136 having provided at its right-hand side the objective lens drive mechanism 138 to be moved thereinto.

Figure 13:
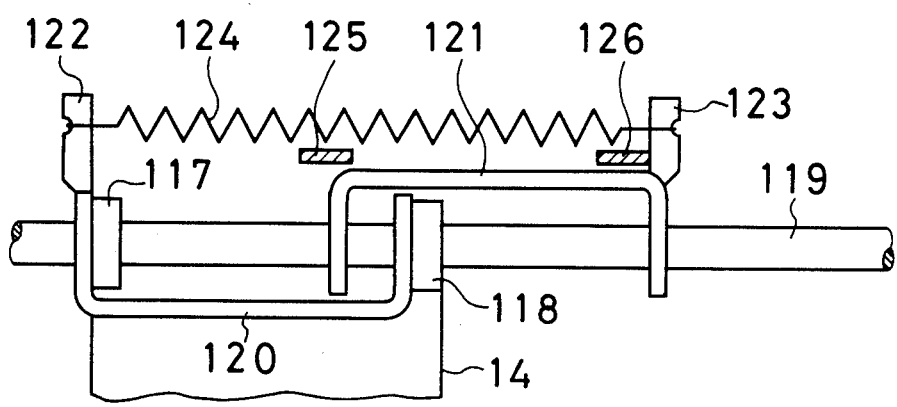
FIG. 13 is a plan view of the same spring mechanism as that shown in FIG. 12, illustrating the state that the shutter is moved leftwardly.

When the shutter 14 is moved leftwardly as set fourth above, the first slide member 120 is moved leftwardly by the guide members 117 and 118 which are moved along the guide rod 119 as shown in FIG. 13 with the result that the spring 124 is extended. Accordingly, if the disc cartridge 11 is taken out from the space between the guide members 130 and 130 after the reproducing thereof was, for example, ended, the engagement between the pin 133 of the lever 131 and the notch 14d of the shutter 14 is broken so that the shutter 14 is returned to the original position by the spring force of the spring 124 and then placed in the state shown in FIG. 12. In other words, the shutter 14 is stopped at the intermediate position by the pair of stopper members 125 and 126 and hence, the shutter 14 completely closes the opening 16.

Figure 16:
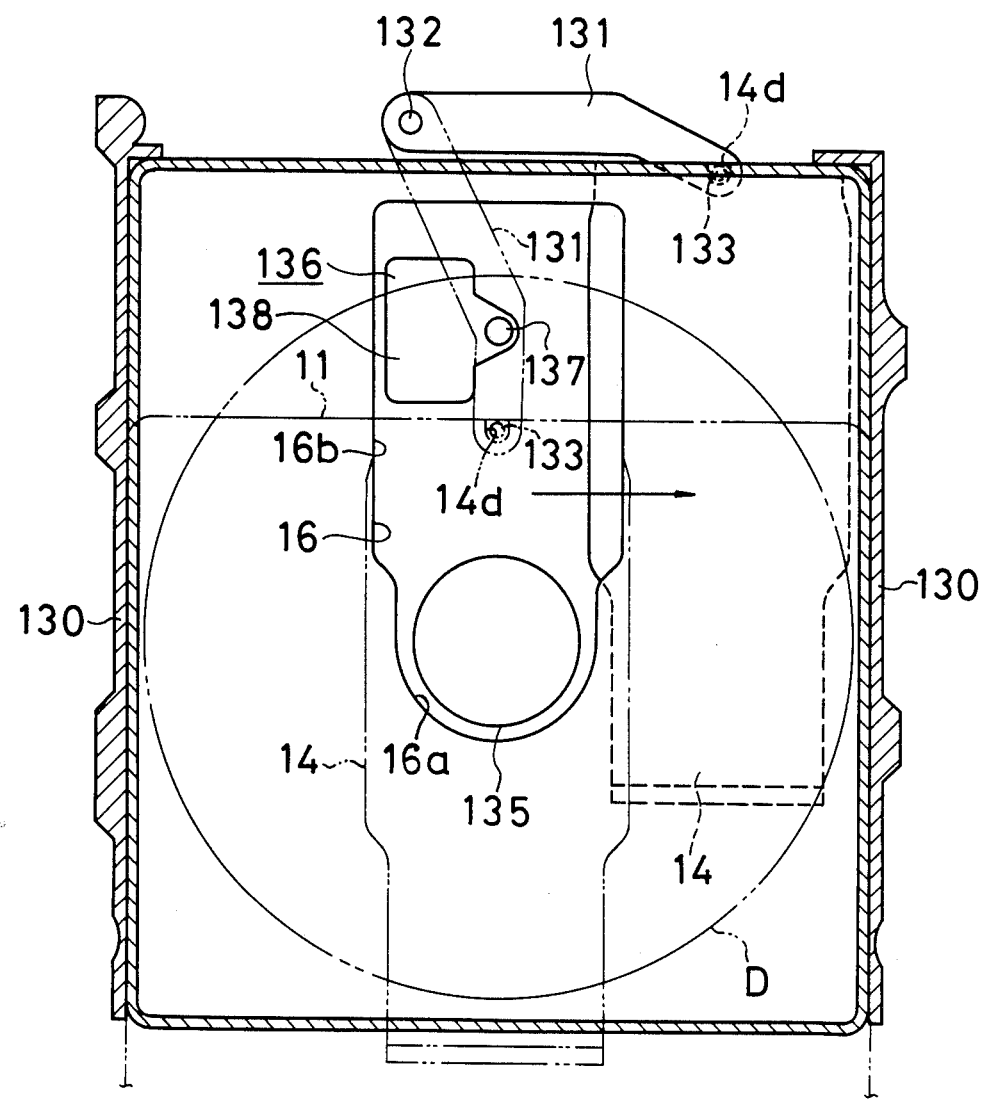
FIG. 16 is a like plan view illustrating the shutter moved in the right-hand direction.

When the pickup device 136 having at its left-hand side the objective lens driving mechanism 138 relative to the objective lens 137 is utilized as shown in FIG. 16, the supporting point pin 132 of the lever 131 is displaced to the left-hand side as shown in FIG. 16. Then, if the disc cartridge 11 is inserted between the guide memebers 130 and 130, the notch 14d of the shutter 14 and the pin 133 of the lever 131 are engaged with each other at the position shown by a two-dot chain line in FIG. 16. If the disc cartridge 11 is further inserted (or further moved upwards in the figure), the shutter 14 is moved rightwardly as the lever 131 is rotated in the counter-clockwise direction. As a result, the shutter 14 completely opens the central opening portion 16a of the opening 16 through which the disc table 135 is inserted and the left-hand portion of the rectangular opening portion 16b of the opening 16 while closing a part of the right-hand portion of the rectangular opening portion 16b, thus enabling the pickup device 136 to move in the axial direction of the disc D.

Figure 14:
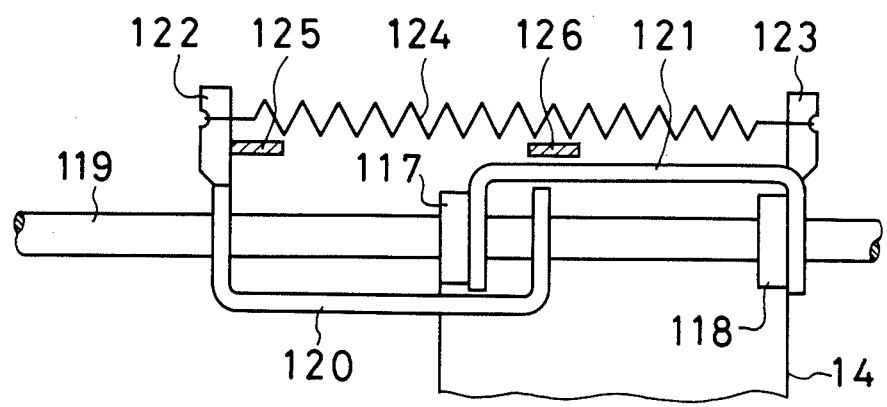
FIG. 14 is a like plan view illustrating the state that the shutter is moved rightwardly.

In this case, as shown in FIG. 14, as the shutter 14 is moved rightwardly, the sliding member 121 is also moved rightwardly along the guide rod 119. Thus, the spring 124 is pulled in the same right-hand direction, thus being extended. Accordingly, if the disc cartridge 11 is unloaded from the recording and/or reproducing apparatus after the playback thereof was ended, the shutter 14 is returned to the central position by the spring force of the spring 124 so as thereby to close the opening 16. According to the mechanism using the spring 124, the shutter 14 movable both in the right-hand and left-hand directions can be always returned to the central position by the use of the single spring 124 and placed at the correct position at which the shutter 14 covers the opening 16.

When the disc cartridge 11 is inserted into the recording and/or reproducing apparatus by a predetermined amount as described above, this shutter 14 is engaged with the operation member or the pin 133 of the lever 131 provided at the side of the recording and/or reproducing apparatus and is slidably moved by this operation member in connection with the movement of the disc cartridge 11, thus to open the opening 16 of the housing main body 12.

By the way, if the disc cartridge 11 is inserted into the recording and/or reproducing apparatus under the correct posture, such as, correct angle, correct direction, etc., the shutter 14 is moved in the predetermined direction by the operation members such as the lever 131 and the like, whereby to open the opening 16 of the housing main body 12. If on the other hand the disc cartridge 11 is inserted into the recording and/or reproducing apparatus under incorrect posture, such as, wrong angle, wrong direction, etc., the shutter 14 is not moved to open the opening 16 by the operating member and also the normal recording and/or reproducing operation is not be carried out by the pickup device 136. In this case the shutter 14 and the pickup device 136 are made in contact with each other, thus disabling the ejection of the disc cartridge 11 from the recording and/or reproducing apparatus. This brings about a trouble in the recording and/or reproducing apparatus.

Therefore, this disc cartridge 11 is provided with a detecting portion used to avoid the mis-insertion thereof. This detecting portion used to prevent the mis-insertion of the disc cartridge 11 will be described with reference to FIGS. 17 to 19.

Figure 17:
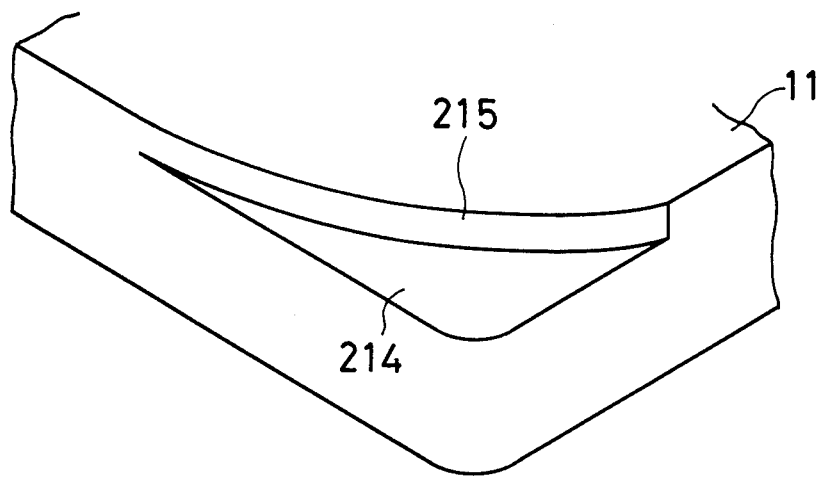
FIG. 17 is an enlarged perspective view illustrating a detected surface portion formed on the housing main body of the disc cartridge of the present invention.

As shown in a magnified scale in FIG. 17, the disc cartridge 11 is provided with a stepped portion 124 at one corner portion of the front end portion thereof in its insertion direction to the recording and/or reproducing apparatus. The end portion of this stepped portion 214 is formed of a detecting surface 215 having a large curvature.

Figure 18:
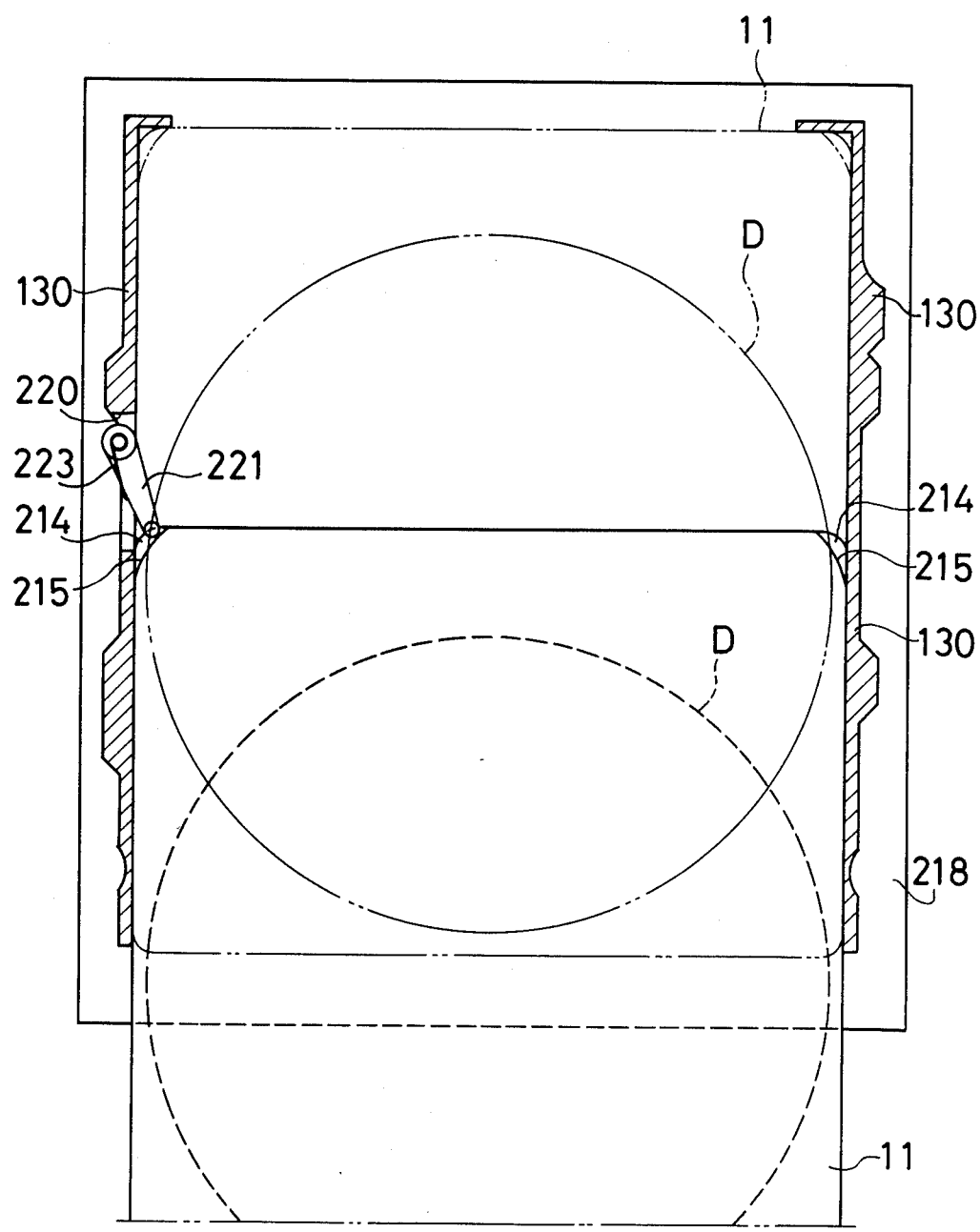
FIG. 18 is a plan view of a main portion of the recording and/or reproducing apparatus according to the invention, illustrating the operating state in which the housing main body is inserted thereinto.

On the other hand, the recording and/or reproducing apparatus onto which the disc cartridge 11 housing therein the disc D is loaded is provided with a support plate 218 as shown in FIG. 18. On the support plate 218, there are formed the pair of right and left insertion guide members 130 and 130 mentioned before. A cutaway portion 220 is formed through at least one guide member 130 and a detecting lever 221 is pivoted to the support plate 218 to oppose the notch 220. The detecting lever 221 is rotatably supported on the support plate 218 by a supporting pin 222 implanted thereon as shown in FIG. 19 and biased by a spring 223 so as to rotate around the supporting pin 222 in the counter-clockwise direction as shown in FIGS. 18 and 19.

Figure 19:
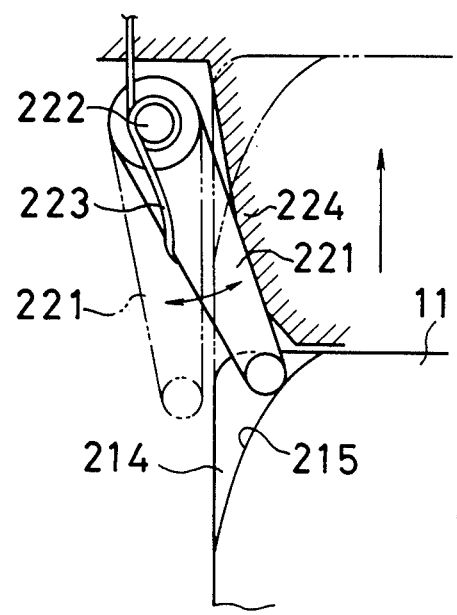
FIG. 19 is a plan view of a main portion of a misinsertion preventing device according to the present invention, in which the disc cartridge is correctly inserted into the recording and/or reproducing apparatus.

With the apparatus constructed as mentioned hereinabove, if the disc cartridge 11 with the disc D housed thereinto is inserted between the insertion guide members 130 and 130 provided on the support plate 218 of the apparatus under the correct posture (correct angle and correct direction, etc.), as shown in FIG. 19, the detecting surface 215 constructing the end portion of the stepped portion 214 formed at the front end side of the disc cartridge 11 in its insertion direction contacts with the free end portion of the detecting lever 221. Then, the free end portion of the detecting lever 221 is pushed by the detected surface 215 as the disc cartridge 11 is further insertion so that the detecting lever 221 is rotated around the supporting pin 222 in the clockwise direction against the spring force of the spring 223 as shown by a two-dot chain line in FIG. 19. Accordingly, in this case, the detecting lever 221 does not obstruct the insertion of the disc cartridge 11 so that the disc cartridge 11 can be inserted into the recording and/or reproducing apparatus up to its correct position. In other words, since the angle of the detected surface 215 is selected so as to rotate the detecting lever 221 in the direction apart from the disc cartridge 11, the correct insertion of the disc cartridge 11 can be detected by utilizing its detecting surface 215 and the loading of the disc cartridge 11 to the apparatus is permitted.

Figure 20:
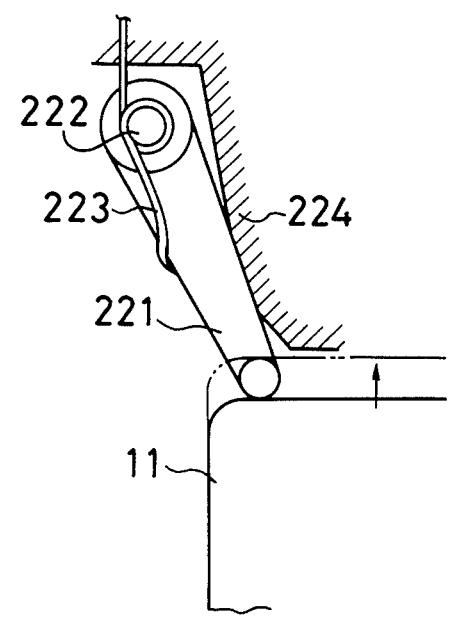
FIG. 20 is a like plan view illustrating that the disc cartridge is erroneously inserted into the recording and/or reproducing apparatus.

If on the other hand the disc cartridge 11 is inserted into the apparatus under the wrong posture (wrong angle and wrong direction, etc.), as shown in FIG. 20, the stepped portion 214 and the detecting surface 215 do not exist at the position of the disc cartridge 11 where they contact with the detecting lever 221. Accordingly, in this case, the flat surface of the top portion of the disc cartridge 11 is directly detected by the detecting lever 221. Then, the flat surface of the top portion of the disc cartridge 11 gives the detecting lever 221 a force by which the lever 221 is rotated around the pin 222 in the counter-clockwise direction. However, since the detecting lever 221 is prevented from being rotated further in the counter-clockwise direction beyond a side wall 224 of the guide member 130, this detecting lever 221 is served as a stopper for preventing the disc cartridge 11 from being inserted into the recording and/or reproducing apparatus. Accordingly, if the disc cartridge 11 is inserted into the recording and/or reproducing apparatus under the incorrect posture, the detecting lever 221 can prevent the disc cartridge 11 from being inserted into the recording and/or reproducing apparatus. In this way, the erroneous insertion of the disc cartridge 11 can be avoided.

According to the thus constructed mis-insertion preventing device, it is formed by only providing the detecting surface 215 on the disc cartridge 11 and the detecting lever 221 at the side of the recording and/or reproducing apparatus at the position where the disc cartridge 11 is inserted thereinto, so that the mis-insertion preventing device can be made simple in construction. In this case, the detecting lever 221 is given a detecting function to detect the mis-insertion of the disc cartridge 11 and has the stopper function to obstruct the advancement of the disc cartridge 11 which is mis-inserted. Therefore, it becomes possible to provide the mis-insertion preventing device which can be manufactured at low cost.

When the disc cartridge 11 is set in the recording and/or reproducing apparatus at its predetermined position as described above, the disc table is inserted into the housing main body 12 through the circular opening portion 16a of the opening 16. Then, the stabilizer 23 is magnetically chucked to the disc table and the disc D is held between the disc table and the stabilizer 23. Under this condition, the pickup device is made to face the disc D through the rectangular-shaped opening portion 16b of the opening 16. When the disc table is rotated, the disc D is also rotated together with the stabilizer 23 with the result that the information signal is recorded by the pickup device or that the recorded signal is reproduced by the pickup device.

Since the disc recording and/or reproducing apparatus is not directly related to the present invention, the disc recording and/or reproducing apparatus will not be described in detail and will not be shown.

According to the present invention, as set forth above, the locking means for locking and releasing the lid to and/or from the housing main body of the disc cartridge is formed of the single arm member having the engagement portion to be engaged with the engaging portion formed on the lid and having flexibility, the operation portion for breaking the engagement of this arm member and the guide member for guiding this operation portion rectilineally, so that the arrangement of this locking means is simplified. At the same time, the elastic deformation of the arm member is performed by the inner movement of the operation portion, so that the arm member can be moved smoothly without being wobbled. Therefore, the engagement portion of the arm member is positively engaged with and disengaged from the engaging portion of the lid and the locking means can be held at respective operation positions. Further, the lid can be prevented from being opened inadvertently relative to the housing main body and is not difficult to be opened when the disc is loaded to and/or unloaded from the disc cartridge. In addition, since the arm member is formed of the single arm which can be elastically deformed, the breakage of the arm member by the accumulated stress can be reduced and the arm member and hence the disc cartridge can be made to have a long life span and the lid of this disc cartridge can be always opened and closed with ease.

Further, according to the present invention, as described above, the shutter is slidably attached to the housing main body so as to cover the opening of the disc cartridge, the shutter can be moved in the direction perpendicular to the moving direction of the pickup device and in both the left and right directions, the opening portion through which the disc table is inserted is always opened even when the shutter is moved in any one of the right and left directions and the opening portion is formed, in which the pickup device can be moved while the shutter covers one portion of the rectangular-shaped opening portion. Therefore, according to the arrangement as described hereinabove, it is possible to provide the disc cartridge which can be used in both cases where the pickup device is located at rightwardly and leftwardly-projected positions.

The above description is given on the preferred embodiments of the invention but it will be apparent that many modifications and variations could be effected by one skilled in the art without departing from the spirits or scope of the novel concepts of the invention so that the scope of the invention should be determined by the appended claims only.

We claim as our invention:

1. A disc cartridge comprising:
   (a) a housing main body for rotatably housing therein a disc-shaped recording medium;
   (b) a lid hinged to said housing main body to be freely rotatable; and
   (c) locking means provided on said housing main body, wherein said locking means is formed of a flexible single arm member having an engagement portion engageable with an engaging member formed on said lid and having elasticity, an operation portion for elastically deforming said single arm member to thereby release the engagement of said engagement portion with said engaging member of said lid, and a guide member for guiding said operation portion rectilineally.

2. A disc cartridge according to claim 1, wherein said guide member of said locking means is formed of a guide shaft portion formed on either one of said housing main body and a side surface of said operation portion and having an axis which is substantially parallel to the engagement release movement direction of said operation portion, and a guide opening portion formed on the other one of said housing main body and said side surface into which said guide shaft is inserted.

3. A disc cartridge according to claim 2, wherein a protrusion is formed on either of an outer peripheral surface of said guide shaft portion and an inner peripheral surface of said guide opening portion.

4. A disc cartridge according to claim 1, wherein said guide portion is formed of a dovetail portion formed on either of said housing main body and a side surface of said operation portion and extended in a direction substantially parallel to an engagement releasing operation direction of said operation portion and a dovetail groove portion formed through the other one of said housing main body and said side surface and engaged with said dovetail portion.

5. A disc cartridge according to claim 4, wherein a protrusion is formed on either of an outer peripheral surface of said dovetail portion and an inner peripheral surface of said dovetail groove portion.

6. A disc cartridge according to claim 1, wherein said locking means, engagement portion, arm member, operation portion and guide portion are integrally formed with said housing main body.

7. A disc cartridge according to claim 1, further comprising a shutter slidably attached to one surface portion of said housing main body to open and close an opening portion formed through said housing main body and through which one portion of said disc-shaped recording medium located on said housing main body is faced to the outside.

8. A disc cartridge according to claim 7, wherein said shutter is freely slid in both right and left directions relative to a central position of said opening portion.

9. A disc cartridge according to claim 8, wherein said shutter has formed its portion to close said opening portion of said housing main body such that a width of a first portion facing to the central portion of said disc-shaped recording medium and at a free end side is selected narrower than a width of a second portion facing to an information signal recording area of said disc-shaped recording medium and located on the side to which said shutter is attached.

10. A disc cartridge according to claim 9, wherein when said shutter is moved and stopped in the direction and at a position to open said opening portion of said housing main body, said second portion of said shutter closes a portion of said opening portion while said first portion of said shutter completely opens said opening portion of said housing main body.

11. A disc cartridge according to claim 7, wherein said housing main body has formed at a corner of its surface with which said shutter slidably contacts a detecting portion used to prevent a mis-insertion of said disc cartridge.

12. A disc cartridge according to claim 11, wherein said detecting portion is formed of a stepped portion lowered from a bottom of said housing main body and a detecting surface at an end portion of said stepped portion which has a predetermined curvature.

* * * * *